Patented May 19, 1953

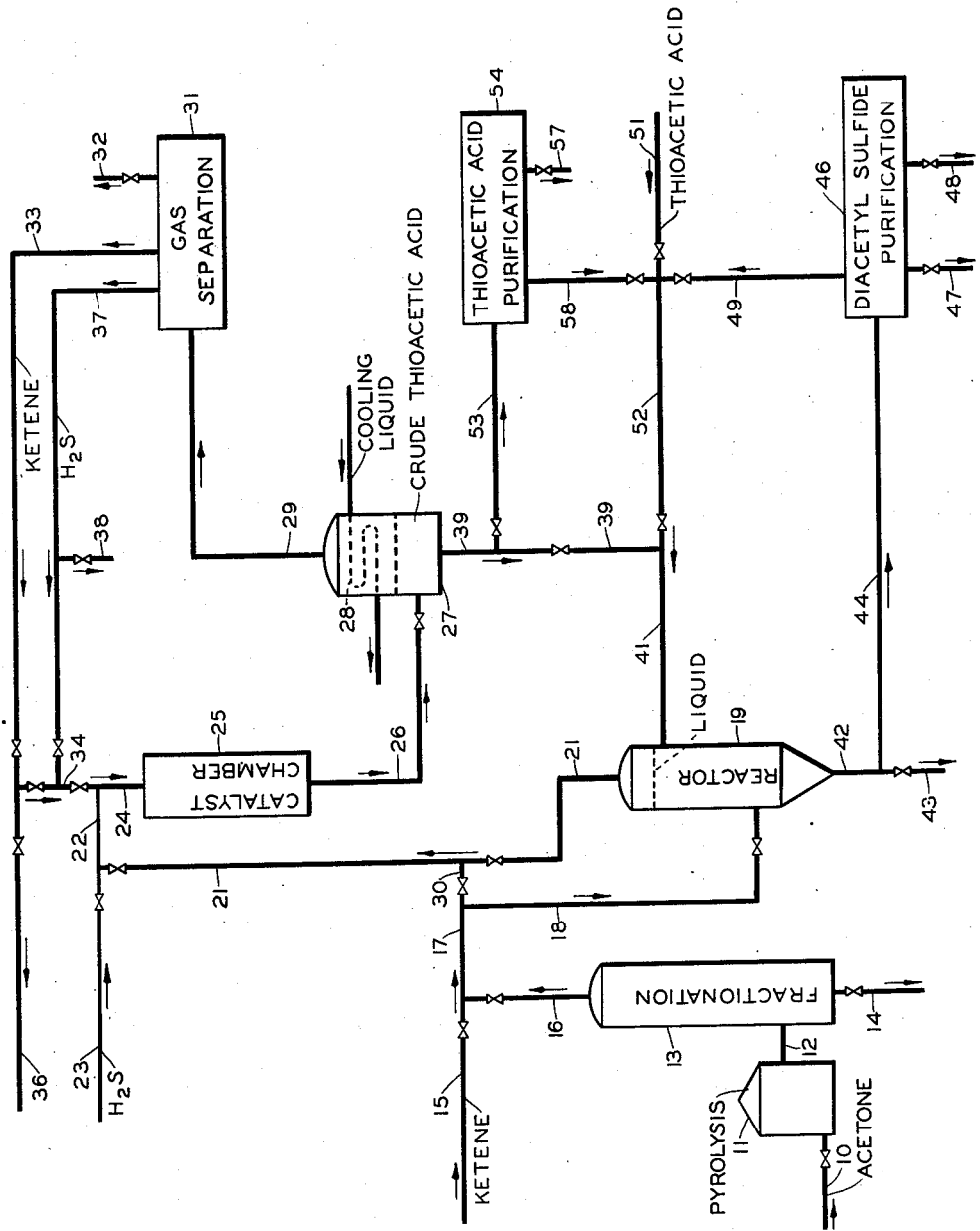

2,639,296

UNITED STATES PATENT OFFICE 2,639,296

MANUFACTURE OF DIACETYL SULFIDE

Willie W. Crouch and Robert T. Werkman, Bartlesville, Okla., assignors to Phillips Petroleum Company, a corporation of Delaware Application January 4, 1949, Serial No. 69,216

13 Claims. (Cl. 260—545)

This invention relates to diacetyl sulfide. In one aspect this invention relates to the production of diacetyl sulfide from ketene and thioacetic acid. Another aspect of this invention relates to a new and novel process for the manufacture of diacetyl sulfide.

Diacetyl sulfide has been prepared by various procedures reported in the art, many of which are either expensive or inefficient, or both, as regards their commercial scale application. One of the various methods reported by workers in the art for preparing diacetyl sulfide involves the reaction of acetyl chloride with potassium sulfide. Another method involves the reaction of acetyl chloride with lead thioacetate. Still another method involves the reaction of acetic anhydride with phosphorus pentasulfide. Of these methods, perhaps the last named is more generally applied. However, even when employing this method, low yields of diacetyl sulfide are obtained concomitantly with large amounts of by-product, such as acetic acid and thioacetic acid. Furthermore, numerous difficulties are encountered in attempting to purify the diacetyl sulfide product from this reaction.

This invention is concerned with the utilization of relatively inexpensive raw materials, in a new and novel process for the manufacture of diacetyl sulfide.

An object of this invention is to provide a process for the production of diacetyl sulfide.

Another object is to provide a process for reacting ketene with thioacetic acid to produce diacetyl sulfide.

Another object is to provide a two-stage process for the production of diacetyl sulfide wherein complete conversion of both reactants, ketene and thioacetic acid can be achieved.

Other objects will be apparent to those skilled in the art in view of the accompanying discussion and disclosure.

In accordance with our invention, ketene is reacted with thioacetic acid to produce diacetyl sulfide. In a preferred embodiment of our invention, the reaction is carried out by passing gaseous ketene in contact with liquid thioacetic acid in the absence of any catalytic material. We have found that when contacting gaseous ketene with liquid thioacetic acid in a temperature range of from 10 to 100° C., preferably from 50 to 85° C., gaseous ketene is readily absorbed by liquid thioacetic acid, and diacetyl sulfide is formed almost quantitatively. Any of various suitable means for effecting contact of gaseous ketene and thioacetic acid reactants may be employed, particularly countercurrent flow contacting of reactants, or merely bubbling ketene through liquid thioacetic acid.

In the practice of our invention we may employ either continuous flow or batch type operation, as desired, and several alternative embodiments of each. For example, when employing continuous operation, excess gaseous ketene may be contacted with liquid thioacetic acid in countercurrent flow relation, and the unreacted portion of ketene may be recovered for recycling or utilization in any desired manner. This procedure may be varied by employing thioacetic acid in excess and conducting the effluent to a fractionation step or other separation means whereby unreacted thioacetic acid is recovered, this latter described embodiment having the advantage of insuring complete conversion of the highly reactive ketene reactant. Similarly, when conducting batch operation of our process either excess ketene or excess thioacetic acid may be employed. A convenient batch-wise operating procedure comprises bubbling ketene through liquid thioacetic acid until analysis of the reaction mixture shows that the desired degree of conversion has been obtained.

A preferred embodiment of the process of our invention is particularly adapted to operation in conjunction with the process disclosed in the co-pending application of W. W. Crouch, Serial No. 65,622, filed December 16, 1948, wherein hydrogen sulfide may be reacted with ketene, in vapor phase, in the presence of a solid adsorption contact catalyst, to form a thioacetic acid-rich product. A stream of liquid thioacetic acid-rich product formed catalytically from hydrogen sulfide and ketene as above described is contacted in another vessel with additional ketene wherein thioacetic acid and ketene react to produce diacetyl sulfide.

Ketene used in the practice of our invention may be relatively pure, or may be associated with other materials. Ketene obtained from the pyrolysis of di-ketene may be used, or impure streams obtained by any of various known pyrolysis methods may be satisfactorily employed. Ketene-containing effluents from the pyrolysis of acetone, the pyrolysis or dehydrogenation of acetaldehyde, the pyrolysis of acetic acid or the pyrolysis or dehydration of acetic anhydride, may be employed. Of the various sources of ketene above mentioned, the pyrolysis of acetone has proved to be particularly satisfactory, not only from the standpoint of the ease and efficiency with which acetone may be converted to ketene, but also in view of the low cost of acetone as a raw material.

Ketene is manufactured commercially by the pyrolysis of acetone, perhaps more often than by any other method. This process has been studied extensively by workers in the art, and many references are available as to the effect of reaction variables such as temperature, pressure, residence time, catalysts and materials of construction of the pyrolysis tube. Generally, yields in the range of about 40 to 80 per cent or higher are obtained when acetone is pyrolyzed at temperatures around 1300° F. The most important variable controlling the ultimate yield of ketene is the conversion of acetone per pass; lower per pass conversions give higher ultimate yields. Thus, in selecting the pyrolysis temperature and rate of charge of acetone to a given pyrolysis tube, a compromise is required between, (1) operating to obtain a high ultimate yield of ketene from the acetone consumed, by using relatively low temperatures and short residence times to obtain low conversions per pass, or (2) operating for maximum ketene production from a given pyrolysis apparatus by using higher temperatures and longer residence times to obtain higher conversions per pass at the sacrifice of ultimate yield.

In the practice of our preferred embodiment, gaseous ketene present in stoichiometric excess, is reacted with thioacetic acid, when a ketene-containing gas is contacted countercurrently with a crude liquid thioacetic acid-containing stream, comprising product of a hydrogen sulfide-ketene reaction described hereafter, to form diacetyl sulfide, substantially quantitatively. Excess ketene, unreacted during the countercurrent contacting is withdrawn and passed together with a stoichiometric excess of hydrogen sulfide into a catalyst zone containing a solid adsorbent catalyst, and therein substantially completely reacted catalytically in the vapor phase, with hydrogen sulfide, to form predominantly thioacetic acid. Excess hydrogen sulfide, unreacted in the catalyst zone is recovered from the catalyst zone effluent and recycled. Crude liquid product, comprising thioacetic acid, is recovered and passed in countercurrent flow relation with ketene, as already described, to form diacetyl sulfide as a product of the process. Operating in this manner, diacetyl sulfide is produced by substantially completely converting both reactants, ketene and thioacetic acid.

In order to present our invention more clearly, reference is made to the attached drawing which diagrammatically illustrates our preferred embodiment, already herein discussed. It is to be understood that the flow diagram is diagrammatic only and that it may be altered in many respects by those skilled in the art and yet remain within the intended scope of our invention.

Referring to the drawing, acetone from line 10 is introduced into pyrolysis zone 11. Pyrolysis zone 11 is maintained usually at atmospheric pressure, and at a temperature in the range of 700 to 1400° F., under which conditions acetone therein is pyrolyzed to form ketene as a chief pyrolysis product. Other pyrolysis products formed in zone 11 are chiefly carbon monoxide, carbon dioxide, and methane together with lower yields of heavier by-product materials, including some ketene polymer. Total effluent from pyrolysis zone 11 is passed through line 12 to fractionation zone 13 wherein it is separated into light ketene-containing overhead product and residual product, comprising unreacted acetone and normally liquid pyrolysis by-product. Dependent on the specific pyrolysis conditions in zone 11, overhead product separated in zone 13 contains from 10 to as high as about 70 weight per cent ketene, not exceeding 72.3 weight per cent, which is the maximum theoretical yield. Residual product from zone 13 is passed through line 14 to further utilization, not shown. Overhead product from fractionation zone 13 comprises ketene together with other light pyrolysis product, predominantly methane, carbon monoxide and carbon dioxide. Ketene-containing product from zone 13 is passed through lines 16, 17 and 18 into reaction zone 19, wherein it is contacted in countercurrent flow relation in stoichiometric excess with a crude liquid thioacetic acid-containing stream, comprising product of a hydrogen sulfide-ketene reaction, under conditions hereafter described to react ketene with thioacetic acid to form diacetyl sulfide. Excess gaseous ketene reactant, unreacted in zone 19, is withdrawn through line 21 and admixed in line 22 with hydrogen sulfide introduced from line 23 in an amount in stoichiometric excess of that required to react with ketene to form thioacetic acid, and the resulting admixture is passed through line 24 into catalyst chamber 25, containing a solid adsorbent contact catalyst maintained at a temperature in the range of 10 to 200° C., preferably 65 to 150° C., wherein ketene is substantially completely reacted catalytically with hydrogen sulfide in the vapor phase to form thioacetic acid as the chief product. The mole ratio of hydrogen sulfide to ketene introduced into zone 25 is greater than 1:1, and is preferably at least as high as 2:1, and within the range of 2:1 to 8:1, or higher if desired. The selected catalyst may be any one of a number of solid adsorbent contact catalysts which may include natural occurring aluminas, alumina-containing catalysts such as titania-alumina, zirconia-alumina, chromia-alumina, molybdena-alumina, vanadium pentoxide-alumina, cupric oxide-alumina; activated charcoal; sulfide catalysts such as molybdenum sulfide; and others. Contact time in catalyst zone 25 is usually within the range of from 0.5 to 10 seconds, although shorter or longer times may be utilized. Operating in this manner, ketene is substantially completely reacted with hydrogen sulfide to form a thioacetic acid-rich product mixture. Total effluent from catalyst zone 25 is passed through line 26 into accumulator-condenser 27 containing coil 28 through which a cooling liquid is passed, suitable for condensing crude thioacetic acid product from gaseous influent introduced through line 26. Crude thioacetic acid condensate is formed in zone 27 and is withdrawn through line 39 and utilized, as will be discussed hereafter. At least a portion of any ketene present in zone 27, i. e., ketene unreacted in zone 25, may react in zone 27 with thioacetic acid to form diacetyl sulfide, in which case the diacetyl sulfide thus formed is a part of the crude liquid thioacetic acid condensate therein. Uncondensed gas from zone 27 contains predominantly unreacted hydrogen sulfide, any unreacted ketene, carbon monoxide, carbon dioxide, and methane, and is passed through line 29 to gas separation zone 31 comprising fractionation equipment absorption equipment or other facilities well known to those skilled in the art, not individually illustrated, suitable for the recovery of hydrogen sulfide and any unreacted ketene from the material introduced through line 29. Hydrogen sulfide, and any ketene in the material introduced through line 29, are separated in zone 31. Any unreacted ketene separated in zone 31 may be recycled to catalyst chamber 25 through lines 33, 34 and 24, or withdrawn from line 33 through line 36 as desired. Hydrogen sulfide separated in zone 31 may be recycled through lines 37, 34 and 24 to catalyst chamber 25, or withdrawn from line 37 through line 38 as desired. Gas residue, predominantly methane, carbon monoxide and carbon dioxide is passed from zone 31 through line 32, for further utilization not shown. Crude thioacetic acid condensate in zone 27 predominantly thioacetic acid together with minor amounts of ketene polymer, and other heavier impurities formed as by-product in zone 25 together with any diacetyl sulfide formed in zone 27, as discussed above, is withdrawn through line 39 and passed through line 41 into reaction zone 19 maintained at a temperature preferably within the range of from 10 to 100° C., and at atmospheric pressure. Thioacetic acid-rich liquid introduced from line 39 is passed in countercurrent flow relation in zone 19 with ketene-containing gas from line 18 introduced into zone 19 in stoichiometric excess of that amount necessary to react with thioacetic acid to form diacetyl sulfide. Gaseous ketene introduced into zone 19 from line 18 dissolves easily in the liquid reaction mixture and readily reacts with thioacetic acid exothermically, and is so introduced and reacted at such a rate that the temperature in zone 19 is maintained as desired within the preferred temperature range.

The mole ratio of ketene to thioacetic acid introduced into reaction to form diacetyl sulfide will be in the range of 0.7:1 to 3.5:1 and preferably in the range of from 1.25:1 to 2.5:1, although higher mole ratios may be utilized, particularly when employing the preferred embodiment illustrated by the figure. The mole ratio of ketene to thioacetic acid so introduced is selected within the preferred range dependent on the specific operation conditions employed and upon the dilution of the reactants. For example, when operating in the upper part of the preferred temperature range, ketene will generally be introduced into the ketene-thioacetic acid reaction zone in a lower mole ratio to thioacetic acid than when operating at a temperature in the lower part of the preferred range; when one reactant is introduced into the reaction zone in a higher state of dilution than the other, it may be desirable to increase the mole ratio of the first said reactant introduced to the second reactant.

In reaction zone 19, thioacetic acid is substantially completely reacted with ketene to form diacetyl sulfide. Liquid product, predominantly diacetyl sulfide, is withdrawn from zone 19 through lines 42 and 43 as a product of the process. However, if desired, product in line 42 may be passed through line 44 to diacetyl sulfide purification zone 46 comprising distillation equipment, solvent extraction facilities or other means well known to those skilled in the art, not individually illustrated, suitable for separating diacetyl sulfide in a high state of purity from the liquid product in line 42, and for recovering any unreacted thioacetic acid therein. Thioacetic acid thus recovered in zone 46 is passed therefrom through line 49 and recycled to reaction zone 19 through lines 52 and 41. Any by-product impurities present in the material from line 44, particularly higher molecular weight materials, may be separated in zone 46 and withdrawn through line 47. Diacetyl sulfide of high purity is withdrawn from zone 46 through line 48 as a product of the process.

If it is desired to introduce a thioacetic acid-rich feed stream to zone 19, of higher thioacetic acid purity than that introduced through lines 39 and 41, material from line 39 may be passed through line 53 to thioacetic acid purification zone 54 comprising distillation equipment, solvent extraction facilities or other product separation means, not individually illustrated, suitable for recovering thioacetic acid from material in line 39, wherein thioacetic acid of any desired purity higher than that of the material in line 39 is separated. Thioacetic acid product, thus purified is withdrawn from zone 54 through line 58 and passed into zone 19 through lines 52, and 41. By-product impurities present in material in line 39, particularly higher molecular weight impurities, include such as ketene polymer, and other impurities inherently introduced by the specific ketene preparation method and are separated in zone 54 and withdrawn through line 57.

Thioacetic acid from any source other than the catalytic process herein described may be utilized in the practice of our invention and may be introduced into reaction zone 19 through lines 51, 52 and 41. Similarly, although ketene prepared by the pyrolysis of acetone is advantageously employed in the practice of our invention, ketene from any other source may be utilized, and may be introduced into the reaction system through line 15. Ketene may be introduced from line 17 directly to catalyst zone 25, through line 30 when desired.

While our process has been described with reference to our preferred method, i. e. reacting liquid thioacetic acid with gaseous ketene, both reactants may be present in the vapor phase, or in the liquid phase, if desired.

Diacetyl sulfide undergoes rapid decomposition at its boiling point at atmospheric pressure. Accordingly, when recovering product in zone 46 it is advantageous to conduct any fractionation of diacetyl sulfide-containing product under subatmospheric pressure conditions.

For convenience and clarity certain apparatus such as pumps, surge tanks, accumulators, etc. have not been shown in the drawing. Obviously, such modifications of the present invention may be practiced without departing from the scope of the invention.

The preferred embodiment, as discussed above and illustrated by the figure, offers the advantage of complete and rapid conversion of thioacetic acid in one pass, while at the same time there is obtained complete conversion of the ketene in one pass by reaction with hydrogen sulfide.

It is another advantage of our process that impure ketene and thioacetic acid feed stocks may each be utilized without the necessity of resorting to expensive recovery and purification steps therefor. The presence of contaminating materials in either feed stock may be tolerated over a wide range of concentrations. Obviously, such contaminants or diluents must be chemically inert under reaction conditions of our process. Ketene-containing stocks having a ketene content within the range of from 10 to 100 weight per cent ketene, and thioacetic acid stocks containing from 20 to 100 per cent thioacetic acid, may each be utilized advantageously.

Our invention is illustrated by the following examples. The reactants, their proportions, and other specific ingredients are presented as being typical and should not be construed to limit the invention unduly.

Example I

Into a cylindrical vessel was placed 260 grams of substantially pure thioacetic acid. A gaseous ketene-containing stream was bubbled through the liquid thioacetic acid for 6.5 hours at the rate of 0.65 mole per hour of ketene. The reaction temperature was controlled at about 60° C. The liquid product was distilled at a pressure of 28 mm., and 350 grams of diacetyl sulfide, boiling in the range from 152 to 154° C., at a pressure of one atmosphere were recovered, representing a yield of 87 per cent based on thioacetic acid. The purified diacetyl sulfide was a water-white lachrymatory liquid with the characteristic odor of diacetyl sulfide. It dissolved only slightly in water, but was dissolved in caustic solution and remained dissolved upon acidification of the caustic solution. The following properties were determined by analyses.

Weight per cent sulfur__ 26.37 (calculated, 27.14)
Neutral equivalent _____ 59.2 (calculated, 59.07)

Example II

Hydrogen sulfide was introduced at a rate of 1.20 moles per hour together with ketene introduced from a source hereinafter described, into a catalyst chamber containing 200 cc. of pelleted alumina, as a catalyst, and was catalytically reacted therein with ketene, in the vapor phase at 100° C., to form a thioacetic acid-rich product. Total effluent was withdrawn from the catalyst chamber, in vapor phase, and passed into a condensing zone and cooled in indirect heat exchange with a cooling liquid to partially condense and form a crude thioacetic acid condensate. Condensate thus formed was passed from the condensing zone into a reactor, or contacting vessel, wherein it was contacted in countercurrent flow relation at a temperature in the range of 55 to 71° C. with ketene, introduced at a rate of 0.71 mole per hour. Ketene was introduced directly into the countercurrent flow with thioacetic acid, above discussed, through a fritted glass plate bubbler, and reacted with thioacetic acid under those flow conditions to form diacetyl-sulfide. Ketene, introduced in stoichiometric excess of thioacetic acid into the contacting vessel, and unreacted therein, was withdrawn and passed to the catalyst zone above described, and was that ketene reacted with hydrogen sulfide as already discussed. The process was continued for 10.75 hours, during which time 393 grams of crude diacetyl sulfide product was collected. Distillation of this product yielded 361 grams of product boiling at 46 to 55° C. at approximately 20 mm. absolute pressure, representing a yield of distilled product of 80 per cent of theoretical, based on ketene. After further distillation, the highly purified water-white lachrymatory liquid diacetyl sulfide had the following properties:

Weight per cent sulfur__ 26.68 (calculated, 27.14)
Neutral equivalent _____ 58.41 (calculated, 59.07)
$n_D^{20}$ _____ 1.4826
$d_4^{20}$ _____ 1.1317

No thioacetic acid could be found in the crude product, indicating the complete conversion of all thioacetic acid produced.

Example III

Another run was effected in the same manner as in Example II, except that only 0.58 mole per hour of ketene was fed to the system, the time was only nine hours, and the catalyst was bauxite instead of alumina. 305 grams of diacetyl sulfide product was obtained and boiled in the range from 55 to 65° C. at about 20 mm. absolute pressure. The distilled product was again a lachrymatory liquid having the characteristic odor of diacetyl sulfide.

As will be evident to those skilled in the art, various modifications of this invention can be made, or followed, in the light of the foregoing disclosure and discussion, without departing from the spirit or scope of the disclosure or from the scope of the claims.

We claim:
1. A process for the production of diacetyl sulfide comprising introducing ketene and thioacetic acid in a mole ratio of ketene to thioacetic acid within the limits of 0.7:1 to 3.5:1 into a reaction zone and therein reacting ketene with thioacetic acid at a temperature within the range of 10 to 100° C., and recovering diacetyl sulfide from the resulting reaction mixture as a product of the process.

2. The process of claim 1 wherein the mole ratio of ketene to thioacetic acid is in the range of 1.25:1 to 2.5:1.

3. A process for the production of diacetyl sulfide comprising introducing gaseous ketene into countercurrent flow relation with liquid thioacetic acid in a mole ratio of ketene to thioacetic acid within the range of 0.7:1 to 3.5:1 and during said countercurrent flow reacting ketene with thioacetic acid at a temperature within the range of 10 to 100° C., and recovering diacetyl sulfide as a product of the process.

4. The process of claim 3 wherein said ketene is introduced into said countercurrent flow in a mole ratio to said thioacetic acid within the limits of 1:1 to 3.5:1.

5. The process of claim 3 wherein thioacetic acid is introduced into said countercurrent flow in a stoichiometric excess of said ketene to maintain said mole ratio of reactants within the limits of 0.7:1 to 1:1.

6. A process for the production of diacetyl sulfide comprising introducing ketene from a source described hereafter together with hydrogen sulfide in a mole ratio of hydrogen sulfide to said ketene within the limits of 2:1 to 8:1, into a reaction zone containing a solid adsorbent contact catalyst and therein reacting ketene with hydrogen sulfide in the vapor phase at a temperature within the limits of 10 to 200° C., recovering unreacted hydrogen sulfide and a thioacetic acid-containing liquid product from the resulting ketene-hydrogen sulfide reaction mixture and recycling recovered hydrogen sulfide to the zone of said catalyst, passing said thioacetic acid-rich liquid product in countercurrent flow relation with ketene introduced in a mole ratio to thioacetic acid greater than 1:1 and not exceeding 3.5:1, during said countercurrent contacting reacting ketene with thioacetic acid at a temperature within the range of 10 to 100° C., recovering unreacted ketene from the resulting ketene-thioacetic acid reaction mixture and passing same together with hydrogen sulfide into the zone of said catalyst, said recovered ketene being that introduced with hydrogen sulfide as described hereinbefore, and recovering diacetyl sulfide from the resulting ketene-thioacetic acid reaction mixture as a product of the process.

7. A process for the manufacture of diacetyl sulfide, comprising passing a stream consisting essentially of ketene in countercurrent flow relation with a stream consisting essentially of thioacetic acid from a source described hereafter, during said countercurrent flow reacting ketene with thioacetic acid at a temperature within the limits of 10 to 100° C. while maintaining a mole ratio of ketene to thioacetic acid in excess of 1:1 and not greater than 3.5:1, withdrawing a ketene-containing gas from the zone of said countercurrent flow and introducing same together with hydrogen sulfide in a mole ratio of hydrogen sulfide to ketene within the limits of 2:1 to 8:1 into a reaction zone containing a solid adsorbent contact catalyst and therein reacting hydrogen sulfide with ketene each in the vapor phase at a temperature within the range of 60 to 400° F. to form thioacetic acid, separating unreacted hydrogen sulfide and a thioacetic acid-rich liquid product from a resulting hydrogen sulfide-ketene reaction product mixture, recycling recovered hydrogen sulfide to the zone of said catalyst, said recovered thioacetic acid-rich product being that reacted with ketene in countercurrent flow relation as described above, and recovering a diacetyl sulfide-rich liquid product from said thioacetic acid-ketene reacting as a product of the process.

8. The process of claim 7 wherein said stream consisting essentially of ketene contains from 10 to 100 weight per cent ketene, and wherein said stream consisting essentially of thioacetic acid contains from 20 to 100 weight per cent thioacetic acid.

9. A process for producing diacetyl sulfide from ketene and hydrogen sulfide, which comprises passing hydrogen sulfide and ketene through a first reaction zone in a mole ratio of hydrogen sulfide to ketene within the limits of 2:1 to 5:1 in contact with a solid adsorbent contact catalyst at a temperature within the range of 10° to 200° C., passing effluents from said first reaction zone to a condensing zone and therein forming a crude thioacetic acid condensate, passing thioacetic acid condensate thus formed to a second reaction zone, passing gaseous ketene in said second reaction zone in a mole ratio to liquid thioacetic acid introduced thereinto greater than 1:1 and not exceeding 3.5:1 and in said reaction zone reacting ketene with thioacetic acid at a temperature within the range of 10° to 100° C., passing unreacted ketene from said second reaction zone to said first reaction zone as at least a part of said ketene fed to said first reaction zone, and recovering diacetyl sulfide from said second reaction zone as a product of the process.

10. A process for the production of diacetyl sulfide comprising introducing ketene from a source described hereafter together with hydrogen sulfide in a mole ratio of hydrogen sulfide to ketene within the limits of 2:1 to 5:1, into a reaction zone containing a solid adsorbent contact catalyst selected from the group consisting of an alumina, charcoal, and molybdenum sulfide, and therein reacting ketene with hydrogen sulfide each in the vapor phase at a temperature within the limits of 10° to 200° C., recovering unreacted hydrogen sulfide and thioacetic acid liquid product from the resulting ketene-hydrogen sulfide reaction mixture and passing the product thus recovered in countercurrent flow relation with ketene in a mole ratio of ketene to thioacetic acid within the limits of 0.7:1 to 3.5:1, during said countercurrent contacting reacting ketene with thioacetic acid at a temperature within the range of 10° to 100° C., recovering unreacted ketene from the resulting ketene-thioacetic acid reaction mixture and passing same together with hydrogen sulfide into the zone of said catalyst, said recovered ketene being that introduced with hydrogen sulfide as described hereinabove, and recovering diacetyl sulfide from the resulting ketene-thioacetic acid reaction mixture as a product of the process.

11. The process of claim 10 wherein said catalyst comprises alumina.

12. The process of claim 11 wherein said catalyst is molybdena-alumina.

13. A process comprising passing hydrogen sulfide and ketene in a mole ratio of hydrogen sulfide to ketene within the range of 2:1 to 8:1 in contact with a solid adsorbent contact catalyst at a temperature within the range of 10 to 200° C., recovering liquid thioacetic acid-containing product from effluents of the zone of said catalyst, contacting ketene with liquid thioacetic acid product thus recovered in a mole ratio to liquid thioacetic acid in said product, greater than 1:1 and not exceeding 3.5:1, at a temperature within the range of from 10 to 100° C., recovering unreacted ketene from the zone of the last said contacting and recycling same as at least a part of said ketene passed to said catalyst zone, and recovering diacetyl sulfide from the zone of the last said contacting as a product of the process.

WILLIE W. CROUCH.
ROBERT T. WERKMAN.

References Cited in the file of this patent

UNITED STATES PATENTS

| Number | Name | Date |
| --- | --- | --- |
| 2,412,036 | Ellingboe | Dec. 3, 1936 |

OTHER REFERENCES

Chick et al., Chem. Zentr., part II, p. 1018, 1908.
Hurd et al., J. A. C. S., vol. 54, pp. 3427–3429 (1932).